United States Patent
Huang et al.

(10) Patent No.: US 10,594,538 B2
(45) Date of Patent: Mar. 17, 2020

(54) TRANSMITTER, RECEIVER, AND SIGNAL PROCESSING METHOD

(71) Applicant: HUAWEI TECHNOLOGIES CO., LTD., Shenzhen, Guangdong (CN)

(72) Inventors: Hao Huang, Shenzhen (CN); Lei Zhao, Wuhan (CN); Bo Duan, Wuhan (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/045,725

(22) Filed: Jul. 25, 2018

(65) Prior Publication Data

US 2018/0337815 A1 Nov. 22, 2018

Related U.S. Application Data

(63) Continuation of application No. PCT/CN2016/094133, filed on Aug. 9, 2016.

(30) Foreign Application Priority Data

Jan. 27, 2016 (CN) .......................... 2016 1 0055594

(51) Int. Cl.
*H04L 27/34* (2006.01)
*H04L 27/36* (2006.01)
(Continued)

(52) U.S. Cl.
CPC .......... *H04L 27/3472* (2013.01); *G06F 11/10* (2013.01); *H04B 10/541* (2013.01);
(Continued)

(58) Field of Classification Search
CPC .............. H04L 27/2096; H04L 27/223; H04L 27/3472; H04L 27/361; H04L 27/36;
(Continued)

(56) References Cited

U.S. PATENT DOCUMENTS

2004/0046607 A1 3/2004 Grange
2004/0219891 A1 11/2004 Hadjichristos
(Continued)

FOREIGN PATENT DOCUMENTS

| CN | 101388878 A | 3/2009 |
|---|---|---|
| CN | 102217215 A | 10/2011 |
| CN | 102647392 A | 8/2012 |
| CN | 103166901 A | 6/2013 |
| JP | 2015076646 A | 4/2015 |

*Primary Examiner* — David B Lugo
(74) *Attorney, Agent, or Firm* — Womble Bond Dickinson (US) LLP

(57) ABSTRACT

A transmitter, a receiver, and a signal processing method are provided. The transmitter includes a constellation mapper, a signal conversion module, a digital signal processor, and a digital-to-analog converter. The constellation mapper is configured to determine a mapping relationship between a bit stream and a constellation point in a polar coordinate system, and generate a constellation symbol data flow according to the mapping relationship. The signal conversion module is configured to convert the constellation symbol data flow into an amplitude signal and a phase signal, where the amplitude signal is a 2-level analog signal, and the phase signal is an 8-level digital signal. The digital signal processor is configured to perform digital signal processing on the phase signal, to generate a multi-level digital signal. The digital-to-analog converter is configured to convert the multi-level digital signal into a multi-level analog signal.

12 Claims, 10 Drawing Sheets

(51) Int. Cl.
 *H04B 10/54* (2013.01)
 *H04B 10/60* (2013.01)
 *H04L 27/38* (2006.01)
 *H04L 27/20* (2006.01)
 *H04L 27/22* (2006.01)
 *G06F 11/10* (2006.01)

(52) U.S. Cl.
 CPC .............. *H04B 10/60* (2013.01); *H04L 27/36* (2013.01); *H04L 27/361* (2013.01); *H04L 27/389* (2013.01); *H04L 27/2096* (2013.01); *H04L 27/223* (2013.01)

(58) Field of Classification Search
 CPC ..... H04L 27/389; H04B 10/541; H04B 10/60; G06F 11/10
 See application file for complete search history.

(56) References Cited

U.S. PATENT DOCUMENTS

| | | | |
|---|---|---|---|
| 2005/0271161 | A1 | 12/2005 | Staszewki et al. |
| 2009/0072921 | A1 | 3/2009 | Schmid |
| 2010/0291885 | A1* | 11/2010 | Shimizu ............... H03F 1/0222 455/102 |
| 2011/0107183 | A1 | 5/2011 | Zhang et al. |
| 2011/0236033 | A1 | 9/2011 | Kikuchi |
| 2011/0305457 | A1* | 12/2011 | Kikuchi ............ H04B 10/5055 398/65 |
| 2012/0281988 | A1* | 11/2012 | Kikuchi ............ H04B 10/5561 398/159 |

* cited by examiner

TRANSMITTER, RECEIVER, AND SIGNAL PROCESSING METHOD

CROSS-REFERENCE TO RELATED APPLICATIONS

This application is a continuation of International Application No. PCT/CN2016/094133, filed on Aug. 9, 2016, which claims priority to Chinese Patent Application No. 201610055594.5, filed on Jan. 27, 2016. The disclosures of the aforementioned applications are hereby incorporated by reference in their entireties.

TECHNICAL FIELD

The present invention relates to the field of optical communications, and more specifically, to a transmitter, a receiver, and a signal processing method.

BACKGROUND

A sharp increase in backbone network data traffic imposes a significantly higher requirement for a transmission rate of a fiber communications system. However, an optical communications system has a limited hardware bandwidth. To transmit a large amount of data in the limited bandwidth, it is essential to improve frequency band utilization.

The foregoing problem can be effectively resolved by using a modulation scheme of high frequency band utilization. Quadrature amplitude modulation (QAM) is a combination of a quadrature-carrier modulation technology and multi-level amplitude keying, features relatively high frequency band utilization, and is widely applied to fields such as optical communications, wideband wireless communications, and digital cable television transmission. A square 16-QAM modulation scheme used in an existing optical communications system features high costs, large power consumption, and high system complexity, and is hard to implement.

SUMMARY

Embodiments of the present invention provide a transmitter, a receiver, and a signal processing method, so as to reduce complexity, power consumption, and costs of a communications system.

According to a first aspect, a transmitter is provided. The transmitter includes a constellation mapper, a signal conversion module, a digital signal processor, and a digital-to-analog converter. The constellation mapper is configured to determine a mapping relationship between a bit stream and a constellation point in a polar coordinate system, and generate a constellation symbol data flow according to the mapping relationship. The signal conversion module is configured to convert the constellation symbol data flow into an amplitude signal and a phase signal, where the amplitude signal is a 2-level analog signal, and the phase signal is an 8-level digital signal. The digital signal processor 330 is configured to perform digital signal processing on the phase signal, to generate a multi-level digital signal. The digital-to-analog converter 340 is configured to convert the multi-level digital signal into a multi-level analog signal.

A star 16-QAM signal is split, in the polar coordinate system, into two parts: an amplitude signal (that is, a 2-level analog signal) and a phase signal (that is, an 8-level digital signal). The amplitude signal is directly input into a saturation driver for amplification. After the phase signal is processed by the digital signal processor, the multi-level digital signal is generated. The DAC converts the multi-level digital signal into consecutive multi-level analog signals, completing signal processing. Compared with the prior art, calculation complexity of the digital signal processor is reduced, and a quantity and power consumption of the digital-to-analog converters are reduced.

Therefore, the transmitter in this embodiment of the present invention maps a bit stream into a constellation symbol data flow in a polar coordinate system, and converts the constellation symbol data flow into an amplitude signal and a phase signal. In this way, calculation complexity of a digital signal processor is reduced, and a quantity and power consumption of digital-to-analog converters are reduced, so as to achieve communication of low power consumption, low complexity, and low costs.

In one embodiment, the transmitter further includes: a saturation driver 350, configured to perform saturated amplification on the amplitude signal; a linear driver 360, configured to perform linear amplification on the multi-level analog signal; and an optical transmitter front-end module 370, configured to convert the amplitude signal obtained after the saturated amplification and the multi-level analog signal obtained after the linear amplification into an optical signal.

In the field of optical communications, the multi-level analog signal amplified by the linear driver and the amplitude signal amplified by the saturation driver may further drive an optical transmitter front end to convert the amplitude signal obtained after the saturated amplification and the multi-level analog signal obtained after the linear amplification into the optical signal. Compared with the prior art, a linear driver is replaced by a saturation driver in the present invention. Under a same swing condition, the saturation driver reduces at least 30% power consumption compared with the linear driver. Therefore, the transmitter in this embodiment of the present invention can reduce communication power consumption.

In one embodiment, the transmitter further includes a radio frequency transmitter front-end module 380, configured to convert the amplitude signal and the multi-level analog signal into a radio frequency signal.

The transmitter may be applied to the field of wireless communications. The transmitter processes a bit stream, to generate an amplitude signal and a multi-level analog signal. The radio frequency transmitter front-end module converts the amplitude signal and the multi-level analog signal into a radio frequency signal, so that large-capacity and long-distance transmission is implemented. According to this embodiment of the present invention, calculation complexity of a digital signal processor is reduced, and a quantity and power consumption of analog-to-digital converters are reduced.

In one embodiment, the constellation mapper 310 is specifically configured to adjust the mapping relationship between the bit stream and the constellation point, so that a constellation decider can enlarge a decision area.

Each symbol and each period of the star 16-QAM transmit four bits, that is, four bits b1, b2, b3, and b4 are mapped into one symbol. It is assumed that a most significant bit b1 is used to select amplitudes R1 and R2, and eight combinations of three bits [b2, b3, b4] are used to select eight phases 0, $\pi/4$, $\pi/2$, $3\pi/4$, $\pi$, $5\pi/4$, $3\pi/2$, and $7\pi/4$. When receiving a signal, a receiver may obtain a decision area according to mapping locations of constellation points.

A smallest decision phase difference of constellation point mapping is π/4, and a smallest decision area of a corresponding receive end is $$\frac{2}{7}V_{RxP}.$$

In this embodiment of the present invention, by adjusting the mapping locations of the constellation points, the smallest decision phase difference of the constellation point mapping may be π/2, and the smallest decision area of the corresponding receive end may be $$\frac{4}{7}V_{RxP},$$

so that a bit error rate is reduced and communication performance is improved.

According to a second aspect, a receiver is provided. The receiver includes a signal decider, an analog-to-digital converter, a digital signal processor, a signal conversion module, and a constellation decider. The signal decider is configured to determine a received first amplitude signal, to generate a 2-level analog signal. The analog-to-digital converter is configured to convert a received first phase signal, to generate a multi-level digital signal, where the first phase signal is a multi-level analog signal. The digital signal processor is configured to convert the multi-level digital signal into an 8-level digital signal. The signal conversion module is configured to convert the 2-level analog signal and the 8-level digital signal into a constellation symbol data flow in a polar coordinate system. The constellation decider 450 is configured to convert the constellation symbol data flow into a bit stream.

In a process of transmitting an optical signal, deviation of the signal occurs due to noise or another factor. The signal decider of the receiver decides the received amplitude signal, and restores the amplitude signal to an original 2-level analog signal. The ADC converts the received phase signal into the multi-level digital signal, and the multi-level digital signal is converted to the 8-level digital signal by means of operations such as balancing of the digital signal processor. Then, the signal conversion module converts the 8-level digital signal and the 2-level analog signal into the constellation symbol data flow in the polar coordinate system. Finally, the constellation decider converts the constellation symbol data flow into the bit stream. By using the receiver in this embodiment compared with the prior art, calculation complexity of the digital signal processor is reduced, and a quantity and power consumption of the analog-to-digital converters are reduced.

Therefore, by using the receiver in this embodiment of the present invention, calculation complexity of a digital signal processor is reduced, and a quantity and power consumption of analog-to-digital converters are reduced, so as to achieve communication of low power consumption, low complexity, and low costs.

In one embodiment, the receiver further includes: an optical receiver front-end module, configured to convert an optical signal into a second amplitude signal and a second phase signal; a saturation trans-impedance amplifier, configured to perform saturated amplification on the second amplitude signal, to generate the first amplitude signal; and a linear trans-impedance amplifier, configured to perform linear amplification on the second phase signal, to generate the first phase signal.

In one embodiment, the receiver may be applied to an optical communications system, and a receiver front end receives an optical signal and converts the optical signal into an electrical signal. The electrical signal includes two channels: the second amplitude signal and the second phase signal. The second amplitude signal is amplified by the saturation trans-impedance amplifier, and is decided by the signal decider as a 2-level digital signal. The second phase signal is amplified by the linear trans-impedance amplifier, and then is sent to the analog-to-digital converter. Compared with the prior art, a linear trans-impedance amplifier is replaced by a saturation trans-impedance amplifier in the present invention. Under a same swing condition, the saturation trans-impedance amplifier reduces at least 30% power consumption compared with the linear trans-impedance amplifier. Therefore, the receiver in this embodiment of the present invention can reduce communication power consumption.

In one embodiment, the receiver further includes a radio frequency receiver front-end module 490, configured to convert a radio frequency signal into the first amplitude signal and the first phase signal.

The receiver may be applied to the field of wireless communications. The radio frequency receiver front-end module converts a received radio frequency signal, to generate an amplitude signal (that is, the first amplitude signal) and a phase signal (that is, the first phase signal). The first amplitude signal and the first phase signal are transmitted to the receiver, so that calculation complexity of the digital signal processor is reduced and a quantity and power consumption of the analog-to-digital converters are reduced.

According to a third aspect, a signal processing method is provided. The method is executed by the modules of the transmitter in the first aspect or any possible implementation manner of the first aspect.

According to a fourth aspect, this application provides a signal processing method. The method is executed by the modules of the receiver in the second aspect or any possible implementation manner of the second aspect.

According to a fifth aspect, a transmitter is provided, including a processor and a memory, where the memory stores a program, and the processor executes the program for executing the signal processing method in the third aspect or any possible implementation manner of the third aspect.

According to a sixth aspect, a receiver is provided, including a processor and a memory, where the memory stores a program, and the processor executes the program for executing the signal processing method in the fourth aspect or any possible implementation manner of the fourth aspect.

Based on the foregoing technical solutions, by using the transmitter, the receiver, and the signal processing method in the embodiments of the present invention, calculation complexity of a digital signal processor is reduced, and quantities of digital-to-analog converters and analog-to-digital converters are reduced, so as to achieve communication of low power consumption, low complexity, and low costs.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
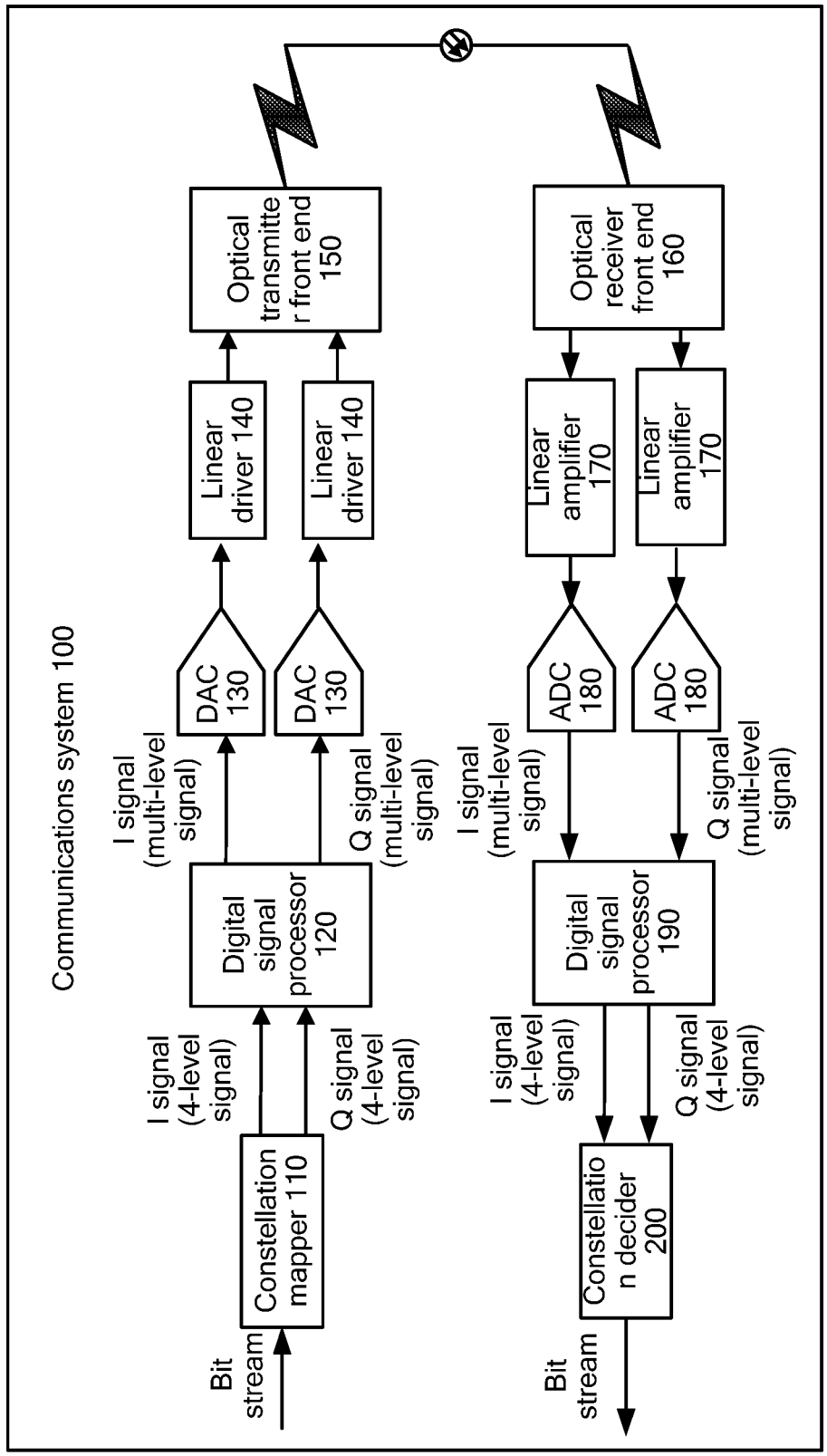
FIG. 1 is a schematic diagram of a communications system in the prior art.

FIG. 1 is a schematic diagram of a communications system in the prior art. The communications system 100 shown in FIG. 1 includes one constellation mapper, one transmitter digital signal processor (TxDSP), two digital-to-analog converters (DAC), two linear drivers (Linear DRV), one optical transmitter front-end module, a fiber link, one optical receiver front-end module, two linear trans-impedance amplifiers, two analog-to-digital converters (ADC), one receiver digital signal processor (RxDSP), and one constellation decider.

A constellation mapper 110 completes a parallel-to-serial conversion of bit streams, and maps the bit streams into constellation points and generates a constellation symbol data flow. For example, in 16-QAM modulation, four bits (0101) are mapped into one point of the constellation points, and a mapping relationship between the four bits and the constellation points may be represented as 1+j*3 in a form of a complex number.

A digital signal processor 120 performs transmitter digital signal processing on an I signal and a Q signal (or an I+jQ complex number signal), to generate a multi-level signal.

A DAC 130 converts a digital signal into an analog signal.

A linear driver 140 performs linear amplification on the analog signal, and drives an optical transmitter front end.

An optical transmitter front-end module 150 completes a conversion from an electrical signal into an optical signal, and further transmits the optical signal by using a transmission medium. For example, the transmission medium may be a fiber, or may be free space, or the like.

An optical receiver front-end module 160 completes a conversion from an optical signal into an electrical signal.

A linear trans-impedance amplifier 170 performs linear amplification on a received analog signal.

An ADC 180 converts the received analog signal into a digital signal.

A digital signal processor 190 performs receive end digital signal processing on the I signal and the Q signal (or the I+jQ complex number signal).

A constellation decider 200 decides a constellation point, and completes a parallel-to-serial conversion of bit streams.

16-QAM is a QAM modulation scheme including 16 symbols. For a 16-QAM signal with 16 sample points, each sample point indicates one vector status. Therefore, 16-QAM has 16 statuses, and every four bits of binary numerals specify one status of the 16 statuses. 16 combinations of carriers and phases are specified in the 16-QAM, and each symbol and each period of the 16-QAM transmit four bits.

Figure 2:
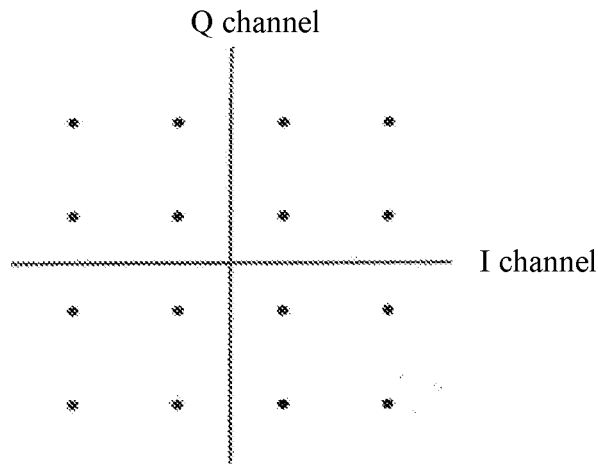
FIG. 2 is a schematic diagram of a specific embodiment of a communications system in the prior art.

FIG. 2 shows constellation points on which "constellation point mapping" and "constellation point decision" are performed. A square 16-QAM signal is split, in a Cartesian coordinate system, into two parts: a real part (an I signal) and an imaginary part (a Q signal), both of which are 4-level signals. After processed by a digital signal processor (a digital signal processor at a transmit end may also be referred to as a "transmitter digital signal processor"), both the I signal and the Q signal are changed to multi-level signals, consecutive multi-level analog signals are generated by means of conversion of the DAC, and by means of amplification of the linear driver, the optical transmitter front end is further driven to transmit an optical signal, so as to convert a bit stream into an optical signal. Therefore, a transmission capacity is increased and a transmission distance is increased.

In one embodiment, at a receive end, an optical receiver front end receives an optical signal, and converts the optical signal into consecutive analog signals. The analog signals are amplified by the linear trans-impedance amplifier, and then are converted by an ADC module into digital signals. In this case, both the I signal and the Q signal are multi-level digital signals. The I signal and the Q signal are restored by a digital signal processor (a digital signal processor at a receive end may also be referred to as a "receiver digital signal processor") to 4-level signals, and are converted into the constellation symbol data flow by means of constellation point decision. Further, the constellation symbol data flow is converted into a bit stream.

It should be understood that when processing the I signal and the Q signal, the digital signal processor may perform digital signal processing on the I+jQ complex number signal, or may separately perform independent digital signal processing on the I signal and the Q signal (that is, may perform digital signal processing on two independent real number signals).

The communications system in the prior art has disadvantages such as high costs, large power consumption, high system complexity, and difficulty in implementation.

Figure 3:
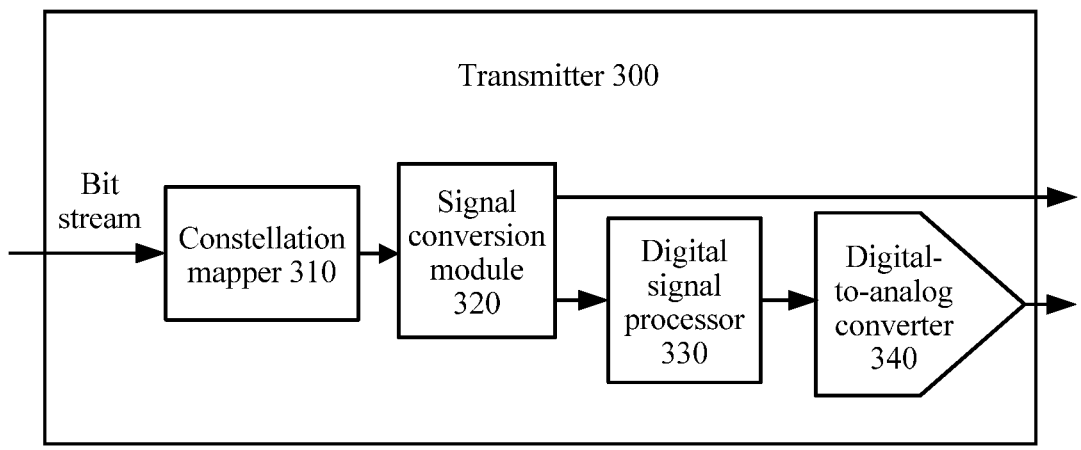
FIG. 3 is a schematic diagram of a transmitter according to an embodiment of the present invention.

FIG. 3 shows a schematic diagram of a transmitter 300 according to an embodiment of the present invention. The transmitter 300 includes a constellation mapper 310, a signal conversion module 320, a digital signal processor 330, and a digital-to-analog converter 340.

The constellation mapper 310 is configured to determine a mapping relationship between a bit stream and a constellation point in a polar coordinate system, and generate a constellation symbol data flow according to the mapping relationship.

The signal conversion module 320 is configured to convert the constellation symbol data flow into an amplitude signal and a phase signal, where the amplitude signal is a 2-level analog signal, and the phase signal is an 8-level digital signal.

The digital signal processor 330 is configured to perform digital signal processing on the phase signal, to generate a multi-level digital signal.

The digital-to-analog converter 340 is configured to convert the multi-level digital signal into a multi-level analog signal.

In one embodiment, a star 16-QAM signal is split, in a polar coordinate system, into two parts: an amplitude signal (2-level signal) and a phase signal (8-level signal). After the phase signal is processed by the digital signal processor, a multi-level signal is generated, and the DAC converts the multi-level signal into consecutive analog signals. In this way, a processed signal is converted into an optical signal, a radio frequency signal, or the like, so that there are advantages such as a large transmission capacity and a long transmission distance.

Therefore, the transmitter in this embodiment of the present invention maps a bit stream into a constellation symbol data flow in a polar coordinate system, and converts the constellation symbol data flow into an amplitude signal and a phase signal. In this way, calculation complexity of a digital signal processor is reduced, and a quantity and power consumption of digital-to-analog converters are reduced, so as to achieve communication of low power consumption, low complexity, and low costs.

In one embodiment, the transmitter 300 further includes:

a saturation driver 350, configured to perform saturated amplification on the amplitude signal;

a linear driver 360, configured to perform linear amplification on the multi-level analog signal; and an optical transmitter front-end module 370, configured to covert the amplitude signal obtained after the saturated amplification and the multi-level analog signal obtained after the linear amplification into an optical signal.

In one embodiment, in the field of optical communications, the multi-level analog signal amplified by the linear driver and the amplitude signal amplified by the saturation driver may further drive an optical transmitter front end to convert the amplitude signal obtained after the saturated amplification and the multi-level analog signal obtained after the linear amplification into the optical signal. Compared with the prior art, a linear driver is replaced by a saturation driver in the present invention. Under a same swing condition, the saturation driver reduces at least 30% power consumption compared with the linear driver. Therefore, the transmitter in this embodiment of the present invention can reduce communication power consumption.

In this embodiment of the present invention, optionally, the transmitter 300 further includes:

a radio frequency transmitter front-end module 380, configured to convert the amplitude signal and the multi-level analog signal into a radio frequency signal.

In one embodiment, the transmitter may be applied to the field of wireless communications. The transmitter processes a signal, and then generates an amplitude signal and a multi-level analog signal. The radio frequency transmitter front-end module converts the amplitude signal and the multi-level analog signal into a radio frequency signal, so that large-capacity and long-distance transmission is implemented. According to this embodiment of the present invention, calculation complexity of a digital signal processor is reduced, and a quantity and power consumption of digital-to-analog converters are reduced.

It should be understood that a transmission medium of the radio frequency signal may be free space. This is not limited in the present invention.

The constellation mapper 310 is specifically configured to adjust the mapping relationship between the bit stream and the constellation point, so that a constellation decider can enlarge a decision area.

Each symbol and each period of the star 16-QAM transmit four bits, that is, four bits b1, b2, b3, and b4 are mapped into one symbol. It is assumed that a most significant bit b1 is used to select amplitudes R1 and R2, and eight combinations of three bits [b2, b3, b4] are used to select eight phases 0, π/4, π/2, 3π/4, π, 5π/4, 3π/2, and 7π/4. According to mapping locations of constellation points, when receiving a signal, a receiver may obtain a decision area according to mapping locations of constellation points.

A smallest decision phase difference of constellation point mapping is π/4, and a smallest decision area of a corresponding receive end is $$\frac{2}{7} V_{RxP}.$$

In this embodiment of the present invention, by adjusting the mapping locations of the constellation points, the smallest decision phase difference of the constellation point mapping may be π2, and the smallest decision area of the corresponding receive end may be $$\frac{4}{7} V_{RxP},$$

so that a bit error rate is reduced and communication performance is improved.

Therefore, the transmitter in this embodiment of the present invention maps a bit stream into a constellation symbol data flow in a polar coordinate system, and converts the constellation symbol data flow into an amplitude signal and a phase signal. In this way, calculation complexity of a digital signal processor is reduced, and a quantity and power consumption of digital-to-analog converters are reduced, so as to achieve communication of low power consumption, low complexity, and low costs.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Figure 4:
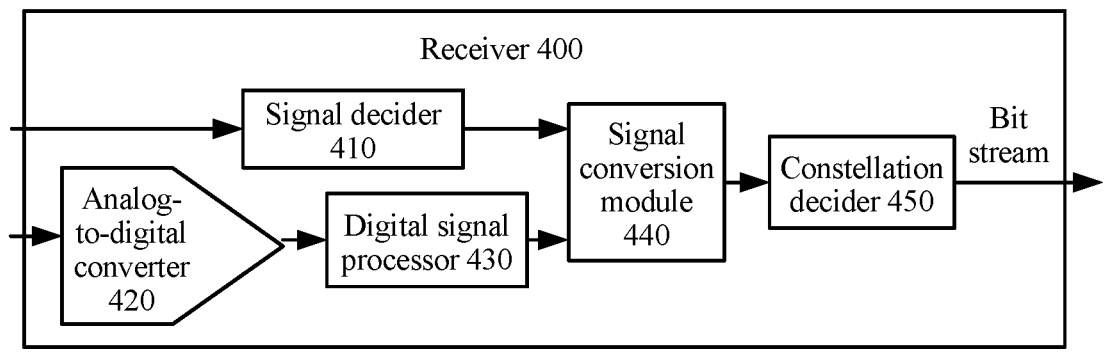
FIG. 4 is a schematic diagram of a receiver according to an embodiment of the present invention.

FIG. 4 shows a schematic diagram of a receiver 400 according to an embodiment of the present invention. The receiver 400 includes a signal decider 410, an analog-to-digital converter 420, a digital signal processor 430, a signal conversion module 440, and a constellation decider 450.

The signal decider 410 is configured to determine a received first amplitude signal, to generate a 2-level analog signal.

The analog-to-digital converter 420 is configured to convert a received first phase signal, to generate a multi-level digital signal, where the first phase signal is a multi-level analog signal.

The digital signal processor 430 is configured to convert the multi-level digital signal into an 8-level digital signal.

The signal conversion module 440 is configured to convert the 2-level analog signal and the 8-level digital signal into a constellation symbol data flow in a polar coordinate system.

The constellation decider 450 is configured to convert the constellation symbol data flow into a bit stream.

In one embodiment, in a process of transmitting an optical signal, deviation of the signal occurs due to noise or another factor. The signal decider 410 of the receiver decides the received amplitude signal, and restores the amplitude signal to an original 2-level analog signal. The ADC converts the received phase signal into a multi-level digital signal, and the multi-level digital signal is restored to an original 8-level digital signal by means of operations such as balancing of the digital signal processor. Then, the signal conversion module converts the 8-level digital signal and the 2-level analog signal into the constellation symbol data flow in the polar coordinate system. Finally, the constellation decider converts the constellation symbol data flow into the bit stream. By using the receiver in this embodiment compared with the prior art, calculation complexity of the digital signal processor is reduced, and a quantity and power consumption of the analog-to-digital converters are reduced.

Therefore, by using the receiver in this embodiment of the present invention, calculation complexity of a digital signal processor is reduced, and a quantity and power consumption of analog-to-digital converters are reduced, so as to achieve communication of low power consumption, low complexity, and low costs.

In one embodiment, the receiver 400 further includes:

an optical receiver front-end module 460, configured to convert an optical signal into a second amplitude signal and a second phase signal;

a saturation trans-impedance amplifier 470, configured to perform saturated amplification on the second amplitude signal, to generate the first amplitude signal; and a linear trans-impedance amplifier 480, configured to perform linear amplification on the second phase signal, to generate the first phase signal.

In one embodiment, the receiver may be applied to an optical communications system, and a receiver front end receives an optical signal and converts the optical signal into an electrical signal. The electrical signal includes two channels: the second amplitude signal and the second phase signal. The saturation trans-impedance amplifier amplifies the second amplitude signal, to generate the first amplitude signal. The linear trans-impedance amplifier amplifies the second phase signal, to generate the first phase signal. Compared with the prior art, a linear trans-impedance amplifier is replaced by a saturation trans-impedance amplifier in the present invention. Under a same swing condition, the saturation trans-impedance amplifier reduces at least 30% power consumption compared with the linear trans-impedance amplifier. Therefore, the receiver in this embodiment of the present invention can reduce communication power consumption.

In this embodiment of the present invention, optionally, the receiver 400 further includes:

a radio frequency receiver front-end module 490, configured to convert a radio frequency signal into the first amplitude signal and the first phase signal.

Specifically, the receiver may be applied to the field of wireless communications. The radio frequency receiver front-end module converts a received radio frequency signal, to generate an amplitude signal (that is, the first amplitude signal) and a phase signal (that is, the first phase signal). The first amplitude signal and the first phase signal are transmitted to the receiver, so that calculation complexity of the digital signal processor is reduced and a quantity and power consumption of the analog-to-digital converters are reduced.

Therefore, by using the receiver in this embodiment of the present invention, calculation complexity of a digital signal processor is reduced, and a quantity and power consumption of analog-to-digital converters are reduced, so as to achieve communication of low power consumption, low complexity, and low costs.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Figure 5:
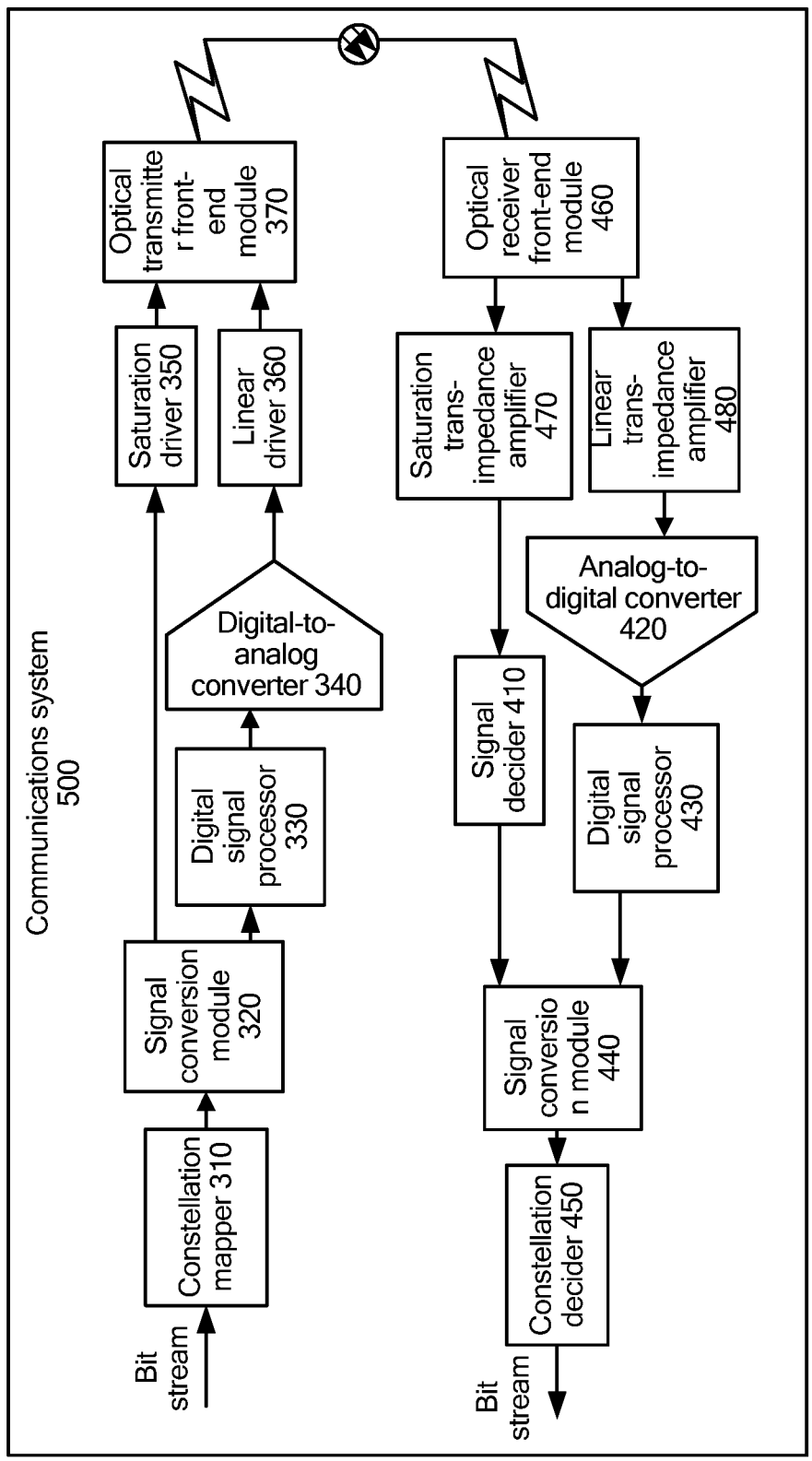
FIG. 5 is a schematic diagram of a communications system according to an embodiment of the present invention.

FIG. 5 shows a schematic diagram of a communications system 500 according to an embodiment of the present invention. The communications system 500 includes a constellation mapper 310, a signal conversion module 320, a digital signal processor 330, a digital-to-analog converter 340, a saturation driver 350, a linear driver 360, an optical transmitter front-end module 370, an optical receiver front-end module 460, a saturation trans-impedance amplifier 470, a linear trans-impedance amplifier 480, a signal decider 410, an analog-to-digital converter 420, a digital signal processor 430, a signal conversion module 440, and a constellation decider 450.

It should be understood that a transmitter and a receiver in the present invention may be applied to the field of optical communications, or may be applied to the field of wireless communications. For ease of description, the field of optical communications is used as an example in the following embodiments for description, but the present invention is not limited thereto. Meanings of various terms in this embodiment are the same as those in the foregoing various embodiments.

Figure 6:
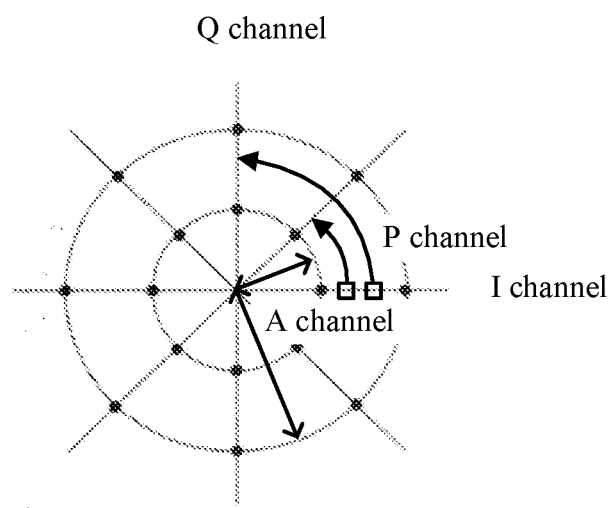
FIG. 6 is a schematic diagram of a constellation diagram according to an embodiment of the present invention.

Specifically, the constellation mapper 310 determines a mapping relationship between a bit stream and a constellation point in a polar coordinate system, and generates a constellation symbol data flow according to the mapping relationship. In this embodiment of the present invention, the constellation mapper maps the bit stream into constellation points of a constellation diagram in the polar coordinate system (as shown in FIG. 6), and obtains a constellation symbol data flow of a complex number form. A complex number expression of the constellation symbol data flow is:

$$X_{16QAM} = R_i \cdot \exp\left(j\frac{\pi}{4}k\right) \qquad (1)$$

$$i = 1, 2; \quad k = -3, -2, -1, 0, 1, 2, 3, 4.$$

Figure 7:
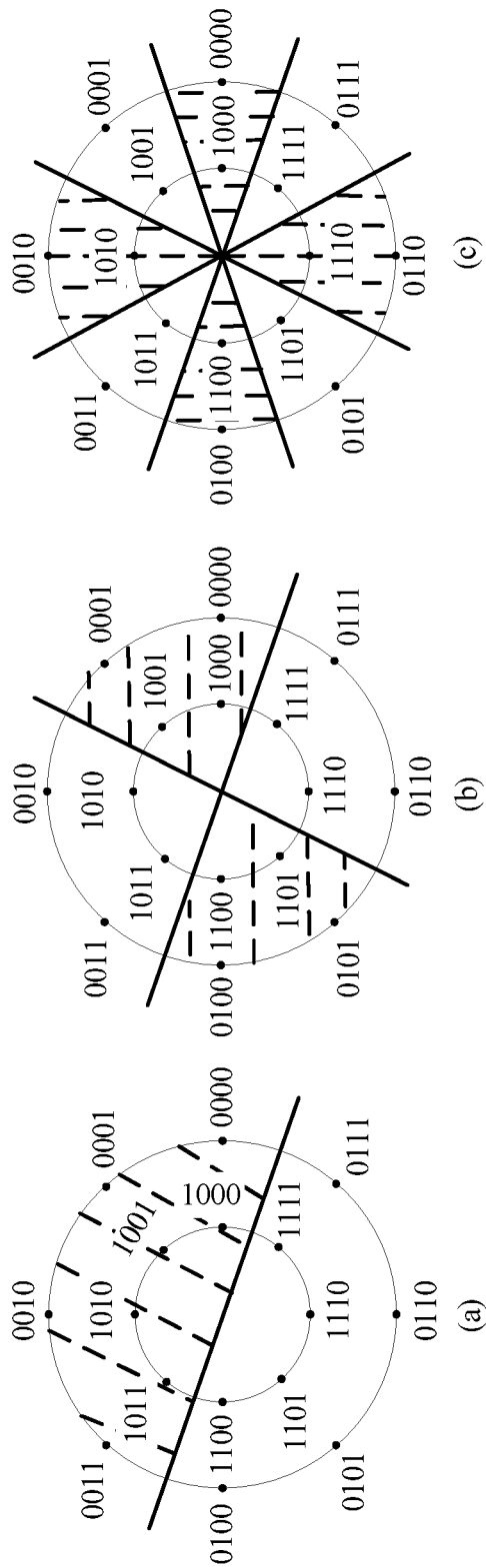
FIG. 7 is a schematic diagram of a constellation diagram according to another embodiment of the present invention.

It should be understood that there may be multiple manners of mapping the bit stream into the constellation points of the constellation diagram in the polar coordinate system, and the present invention is not limited thereto. For example, mapping the bit stream into the constellation points may be shown in FIG. 7a.

In FIG. 7a, a rightmost point on an outer ring shown is 0000 (binary), that is, decimal 0, a rightmost point on an inner ring is 1000 (binary), that is, decimal 8, and constellation points are counterclockwise distributed.

0 to 15 are decimal numerals, and respectively correspond to corresponding binary numerals, as shown in Table 1:

TABLE 1

| Decimal numeral | 0 | 1 | 2 | 3 | 4 | 5 | 6 | 7 |
|---|---|---|---|---|---|---|---|---|
| Binary numeral | 0000 | 0001 | 0010 | 0011 | 0100 | 0101 | 0110 | 0111 |
| Decimal numeral | 8 | 9 | 10 | 11 | 12 | 13 | 14 | 15 |
| Binary numeral | 1000 | 1001 | 1010 | 1011 | 1100 | 1101 | 1110 | 1111 |

In one embodiment, the signal conversion module 320 is configured to convert the constellation symbol data flow into an amplitude signal (which may be referred to as "A signal") and a phase signal (which may be referred to as "P signal"), where the amplitude signal is a 2-level analog signal, and the phase signal is an 8-level digital signal. The signal conversion module denotes the complex number expression of the constellation symbol data flow as a form of an amplitude (A) and a phase (P):

$$\begin{cases} A_{16QAM} = R_i & i = 1, 2 \\ P_{16QAM} = \frac{\pi}{4}k & k = -3, -2, -1, 0, 1, 2, 3, 4 \end{cases} \qquad (2)$$

A value of the A signal may be:

$$A_{16QAM} \Rightarrow A_{DRV} \in \{-V_1, V_1\} \qquad (3)$$

where $V_1 = V_{1\text{-}pp}/2$ and $V_{1\text{-}pp}$ is an input signal peak-to-peak value of the saturation driver.

Correspondingly, a value of the P signal may be:

$$P_{16QAM} \Rightarrow P_{TxDSP} \in \{-V_2, -5/7V_2, -3/7V_2, -1/7V_2, 1/7V_2, 3/7V_2, 5/7V_2, V_2\} \qquad (4)$$

where $V_2 = V_{2\text{-}pp}/2$ and $V_{2\text{-}pp}$ is an input signal peak-to-peak value of the linear driver.

It should be understood that $V_{1\text{-}pp}$ or $V_{2\text{-}pp}$ is a reference value. If the transmitter is applied to the field of wireless communication, a parameter related to a radio frequency transmitter may be selected as the reference value, and the present invention is not limited thereto.

In one embodiment, the constellation mapper 310 is specifically configured to:

adjust the mapping relationship between the bit stream and the constellation point, so that a constellation decider can enlarge a decision area.

In this embodiment of the present invention, each symbol and each period of a star 16-QAM transmit four bits, that is, four bits b1, b2, b3, and b4 are mapped into one symbol. It is assumed that a most significant bit b1 is used to select amplitudes (R1 and R2), and eight combinations of three bits [b2, b3, b4] are used to select eight phases (0, π/4, π/2, 3π/4, π, 5π/4, 3π/2, and 7π/4). According to mapping locations of constellation points, when receiving a signal, the receiver may obtain a decision area according to mapping locations of constellation points. As shown in FIG. 7(a), FIG. 7(b), and FIG. 7(c), shaded parts in the figures are the decision areas. A larger smallest decision area indicates better communication performance. For example, a bit error rate exists in a communication process, and therefore, a larger smallest decision area indicates a smaller bit error rate of signal processing.

The first bit 'b1' is decided by the amplitudes (R1 and R2), and the second, the third, and the fourth bits [b2, b3, and b4] are decided by different phase areas. As shown in FIG. 7(a), when b2 is equal to zero, the decision area is a shaded part, and the shaded part indicates that a phase difference is π. As shown in FIG. 7(b), when b3 is equal to zero, the decision area is a shaded part, and the shaded part indicates that a smallest phase difference is π/2. As shown in FIG. 7(c), when b4 is equal to zero, the decision area is a shaded part, and the shaded part indicates that a smallest phase difference is π/4. Therefore, a smallest decision phase difference of constellation point mapping is π/4, and a smallest decision area of a corresponding receive end is $$\frac{2}{7}V_{RxP}.$$

Figure 8:
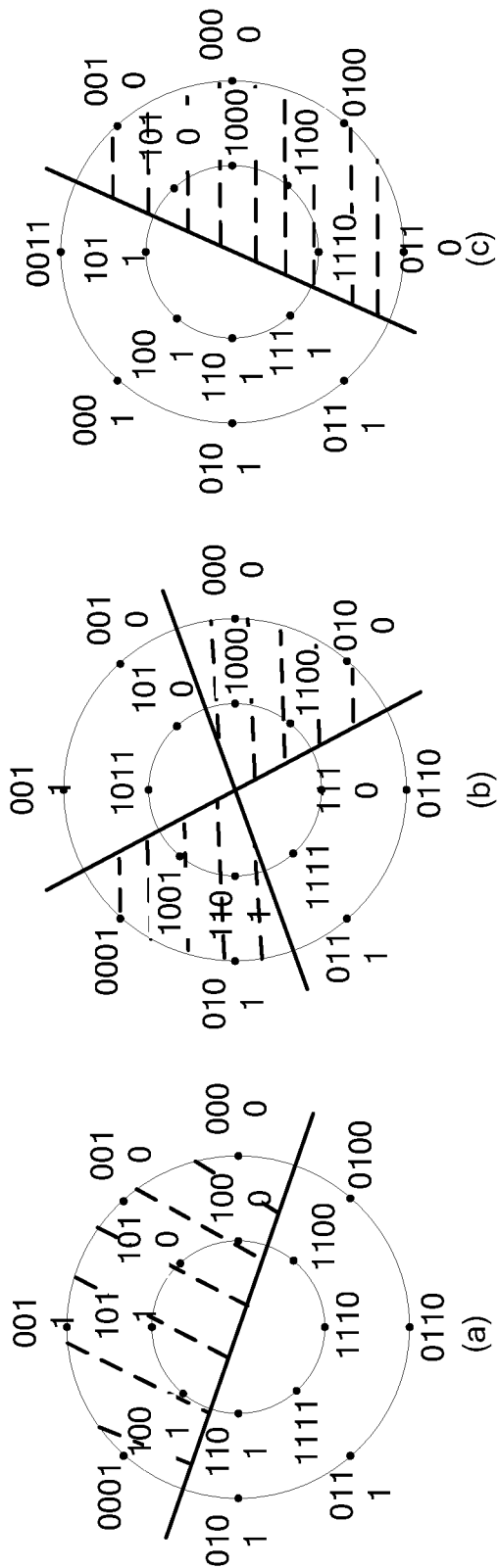
FIG. 8 is a schematic diagram of a constellation diagram according to another embodiment of the present invention.

In this embodiment of the present invention, by adjusting the mapping relationship between the bit stream and the constellation point, the smallest decision phase difference of the constellation point mapping may be π/2, and the smallest decision area of the corresponding receive end may be $$\frac{4}{7}V_{RxP},$$

so that communication performance is improved. For example, represented by decimal numerals 0 to 15, numerals shown in FIG. 8(a), FIG. 8(b), and FIG. 8(c) are counterclockwise represented from zero as 0, 2, 3, 1, 5, 7, 6, 4, 8, 10, 11, 9, 13, 15, 14, and 12. According to constellation point mapping of the solution, a smallest decision phase difference is π/2, and a smallest decision area of a corresponding receive end is $$\frac{4}{7}V_{RxP}.$$

In one embodiment, when the smallest decision phase difference is π/2, the constellation point mapping may also have the following solutions:

(1) 0, 4, 5, 1, 3, 7, 6, 2, 8, 12, 13, 9, 11, 15, 14, and 10;
(2) 0, 4, 6, 2, 3, 7, 5, 1, 8, 12, 14, 10, 11, 15, 13, and 9;
(3) 0, 1, 5, 4, 6, 7, 3, 2, 8, 9, 13, 12, 14, 15, 11, and 10;
(4) 0, 1, 3, 2, 6, 7, 5, 4, 8, 9, 11, 10, 14, 15, 13, and 12;
(5) 0, 2, 6, 4, 5, 7, 3, 1, 8, 10, 14, 12, 13, 15, 11, and 9.

It should be understood that a decision phase difference that can be enlarged and a constellation point mapping solution are not limited in this embodiment of the present invention.

In one embodiment, the digital signal processor 330 is configured to perform digital signal processing on the phase signal, to generate a multi-level digital signal. In this embodiment of the present invention, input/output data of the digital signal processor of the transmitter is a real number, and an internal processing algorithm of the digital signal processor may be simplified as real number processing.

It may be learned from the foregoing description that a digital signal processor in the prior art may perform digital signal processing on an I+jQ complex number signal, or may separately perform independent digital signal processing on an I signal and a Q signal. Compared with a complex number calculation, the digital signal processor in this embodiment of the present invention performs calculation only on the real number, so that calculation complexity is obviously reduced. Alternatively, in the prior art, the digital signal processor separately performs real number calculation on the I signal and the Q signal. Comparatively, in this embodiment of the present invention, real number calculation is performed only on a phase signal, and calculation complexity is still reduced. The digital signal processor occupies relatively large transistor resources, and has a relatively large chip area and high costs. Therefore, 50% power consumption can be reduced when one signal that uses the digital signal processor is reduced.

Compared with complex number calculation, calculation complexity of real number calculation is significantly reduced, for example:

$$x = x_I + i^* x_Q, \quad y = y_I + i^* y_Q \quad (5)$$

where $x_I$, $y_I$ and $x_Q$, $y_Q$ are respectively real parts and imaginary parts of complex numbers x and y, and i is an imaginary unit.

In the digital signal processor, multiplication of two complex numbers may be represented as:

$$x \cdot y = (x_I + i * x_Q) \cdot (y_I + i * y_Q) \quad (6)$$
$$= (x_I \cdot y_I - x_Q \cdot y_Q) + i * (x_I \cdot y_Q + x_Q \cdot y_I)$$

As shown in expression (6), one time of complex number multiplication includes four times of real number multiplication and two times of real number addition.

Addition of two complex numbers may be represented as:

$$x + y = (x_I + y_I) + i^*(x_Q + y_Q) \quad (7)$$

As shown in expression (7), one time of complex number addition includes two times of real number addition.

Therefore, if modules of the "digital signal processor 120" and the "digital signal processor 330" use a same digital signal process algorithm, complexity of the "digital signal processor 330" is less than half of complexity of the "digital signal processor 120".

Optionally, the digital signal processor may perform device bandwidth pre-compensation, device/link nonlinear pre-compensation, fiber dispersion pre-compensation, or the like on a signal, and the present invention is not limited thereto.

The digital-to-analog converter 340 is configured to convert the multi-level digital signal into a multi-level analog signal. The DAC converts the multi-level signal into consecutive analog signals, completing signal processing, so as to prepare for long-distance transmission of the signal. In the present invention, only one signal uses the digital-to-analog converter. Therefore, a quantity of used digital-to-analog converters is reduced, so that costs and power consumption are separately reduced by 50%.

Therefore, by using the transmitter in this embodiment of the present invention, calculation complexity of a digital signal processor is reduced, and a quantity and power consumption of digital-to-analog converters are reduced, so as to achieve communication of low power consumption, low complexity, and low costs.

In one embodiment, in the field of optical communications, the saturation driver 350 is configured to perform saturated amplification on the amplitude signal, and may further drive an optical transmitter front end to convert an amplitude signal obtained after the saturated amplification into an optical signal.

In one embodiment, the linear driver 360 is configured to perform linear amplification on the multi-level analog signal. Compared with the prior art, a linear driver is replaced by a saturation driver in this embodiment of the present invention. Under a same swing condition, the saturation driver reduces at least 30% power consumption compared with the linear driver. Therefore, the transmitter in this embodiment of the present invention can reduce communication power consumption.

In one embodiment, the optical transmitter front-end module 370 is configured to covert the amplitude signal obtained after the saturated amplification and the multi-level analog signal obtained after the linear amplification into an optical signal. Converting a bit stream into an optical signal enables a larger signal transmission capacity and a longer transmission distance.

It should be understood that a transmission medium of the optical signal may be a fiber, or may be free space. This is not limited in the present invention.

In one embodiment, the optical receiver front-end module 460 is configured to convert an optical signal into a second amplitude signal and a second phase signal. The receiver may be applied to an optical communications system. A receiver front end receives the optical signal, and converts the optical signal into an electrical signal. The electrical signal includes two channels: the second amplitude signal and the second phase signal.

In one embodiment, the saturation trans-impedance amplifier 470 is configured to perform saturated amplification on the second amplitude signal, to generate a first amplitude signal. The linear trans-impedance amplifier 480 is configured to perform linear amplification on the second phase signal, to generate a first phase signal. A saturation trans-impedance amplifier amplifies an amplitude signal and transmits the amplitude signal to a signal decider. A linear trans-impedance amplifier amplifies a phase signal and transmits the phase signal to an analog-to-digital converter.

In one embodiment, the signal decider 410 is configured to determine the first amplitude signal, to generate a 2-level analog signal. In a process of transmitting an optical signal, deviation of the signal occurs due to noise or another factor. The signal decider 410 of the receiver decides a received amplitude signal, and restores the amplitude signal to an original 2-level analog signal. For example, a decision threshold of the signal decider may be set to $V_{TIA,th}=0$. When a signal amplitude is less than the threshold, an output signal level of the signal decider is set to $V_{det1}$. When the signal amplitude is greater than the threshold, the output signal level of the signal decider is set to $V_{det2}$.

It should be noted that values of decision output signals $V_{det1}$, $V_{det2}$ are determined according to an actual application situation of a circuit.

In one embodiment, the analog-to-digital converter 420 is configured to convert the first phase signal, to generate a multi-level digital signal, where the first phase signal is a multi-level analog signal. In the present invention, only one signal (that is, the first phase signal) uses the analog-to-digital converter. Therefore, a quantity of used analog-to-digital converters is reduced, so that costs and power consumption are separately reduced by 50%.

In one embodiment, the digital signal processor 430 is configured to convert the multi-level digital signal into an 8-level digital signal. The ADC converts the received first phase signal into the multi-level digital signal, and the multi-level digital signal is converted into the 8-level digital signal by means of operations such as balancing of the digital signal processor. In this embodiment of the present invention, a real number calculation is performed on only one signal (that is, the multi-level digital signal), thereby reducing calculation complexity.

In one embodiment, the signal conversion module 440 is configured to convert the 2-level analog signal and the 8-level digital signal into a constellation symbol data flow in a polar coordinate system. An algorithm of a signal conversion module at a receive end and an algorithm of a signal conversion module at a transmit end are inverse operations of each other. For example, $$A_{dei} = \{V_{det1}, V_{det2}\} \Rightarrow A_{Rx16QAM} = R_i, i = 1, 2 \qquad (8)$$

A digital signal processor at the receive end may restore phase signal data to eight levels:

$$P_{RxDSP} \in \{-V_{RxP}, -5/7\ V_{RxP}, -3/7\ V_{RxP}, \qquad (9)$$
$$-1/7\ V_{RxP}, 1/7\ V_{RxP}, 3/7\ V_{RxP}, 5/7\ V_{RxP}, V_{RxP}\} \Rightarrow$$
$$P_{Rx16QAM} = \frac{\pi}{4}k, k = -3, -2, -1, 0, 1, 2, 3, 4$$

where $V_{RxP}$ is a maximum value of an output signal of the digital signal processor.

Further, a receive end signal $X_{Rx16QAM}$ may be obtained from expression (8) and expression (9).

In one embodiment, the constellation decider 450 is configured to convert the constellation symbol data flow into a bit stream. The signal conversion module converts the 8-level digital signal and the 2-level analog signal into the constellation symbol data flow in the polar coordinate system. Finally, the constellation decider converts the constellation symbol data flow into the bit stream.

Therefore, by using the receiver in this embodiment of the present invention, calculation complexity of a digital signal processor is reduced, and a quantity and power consumption of analog-to-digital converters are reduced, so as to achieve communication of low power consumption, low complexity, and low costs.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Figure 9:
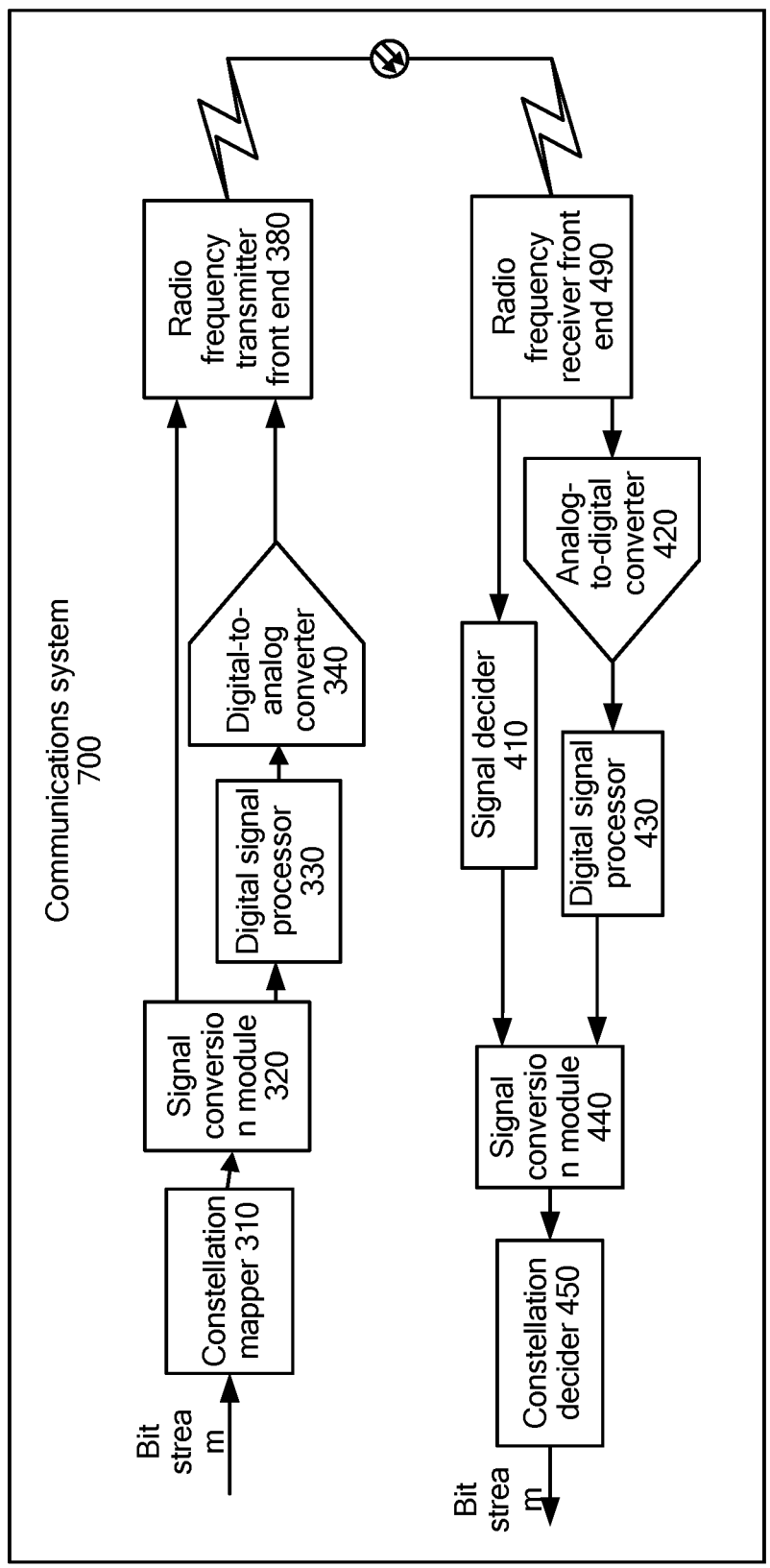
FIG. 9 is a schematic diagram of a communications system according to another embodiment of the present invention.

FIG. 9 shows a schematic diagram of a communications system 700 according to another embodiment of the present invention. The communications system 700 includes a constellation mapper 310, a signal conversion module 320, a digital signal processor 330, a digital-to-analog converter 340, a radio frequency transmitter front-end module 380, a radio frequency receiver front-end module 490, a signal decider 410, an analog-to-digital converter 420, a digital signal processor 430, a signal conversion module 440, and a constellation decider 450.

A transmitter and a receiver in the present invention may be applied to the field of wireless communication. For ease of description, the field of wireless communication is used as an example in the following embodiments for description, but the present invention is not limited thereto. Meanings of various terms in this embodiment are the same as those in the foregoing various embodiments.

The constellation mapper 310 determines a mapping relationship between a bit stream and a constellation point in a polar coordinate system, and generates a constellation symbol data flow according to the mapping relationship. The signal conversion module 320 splits, in the polar coordinate system, the constellation symbol data flow into two parts: an amplitude signal (2-level signal) and a phase signal (8-level signal). After the phase signal is processed by the digital signal processor 330, a multi-level digital signal is generated, and the digital-to-analog converter 340 converts the multi-level digital signal into consecutive multi-level analog signals. The radio frequency transmitter front-end module 380 converts the amplitude signal and the multi-level analog signal into a radio frequency signal, so that large-capacity and long-distance transmission is implemented. According to this embodiment of the present invention, calculation complexity of a digital signal processor is reduced, and a quantity and power consumption of digital-to-analog converters are reduced.

The radio frequency receiver front-end module 490 converts a received radio frequency signal into a first amplitude signal and a first phase signal. In a process of transmitting a radio frequency signal, deviation of the signal occurs due to noise or another factor. The signal decider 410 of the receiver decides the received first amplitude signal, and restores the first amplitude signal to an original 2-level analog signal. The analog-to-digital converter 420 converts the received first phase signal into a multi-level digital signal, and the multi-level digital signal is converted into an 8-level digital signal by means of operations such as pre-compensation of the digital signal processor 430. Then, the signal conversion module 440 converts the 8-level digital signal and the 2-level analog signal into the constellation symbol data flow in the polar coordinate system. Finally, the constellation decider 450 converts the constellation symbol data flow into the bit stream. Compared with the prior art, in this embodiment of the present invention, calculation complexity of the digital signal processor is reduced, and a quantity and power consumption of the analog-to-digital converters are reduced.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Detailed descriptions of a transmitter and a receiver according to embodiments of the present invention are made in the foregoing with reference to FIG. 3 and FIG. 4 to FIG. 9, and detailed descriptions of a signal processing method according to the embodiments of the present invention are made in the following with reference to FIG. 10 and FIG. 11.

Figure 10:
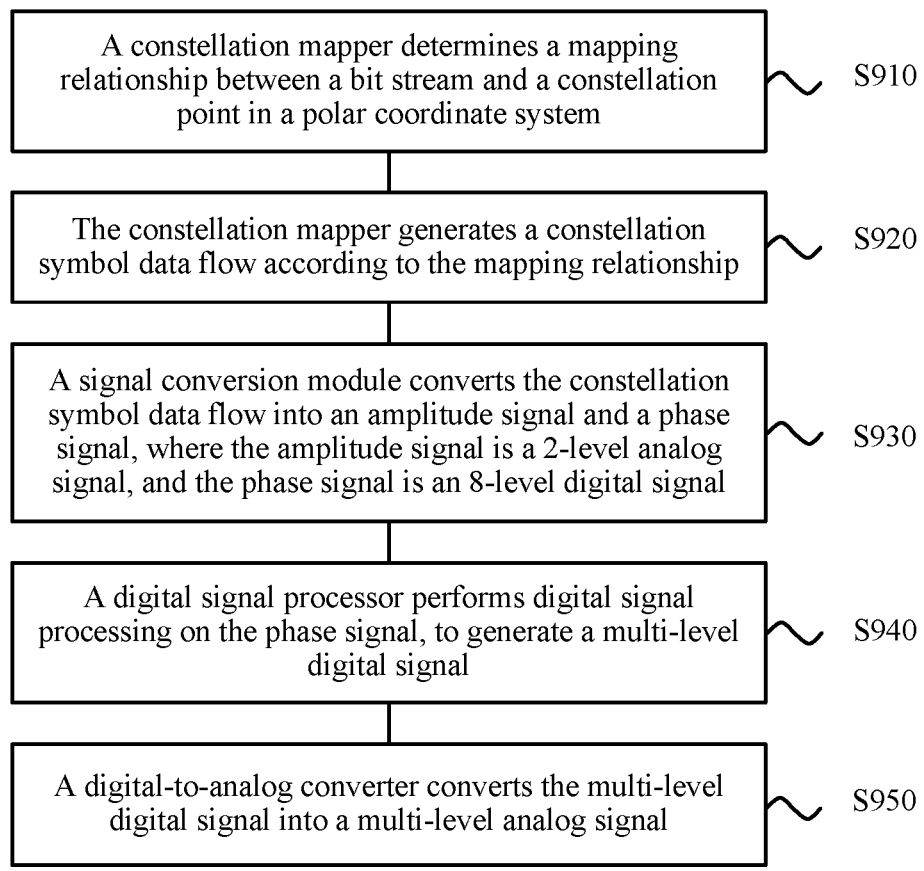
FIG. 10 is a schematic flowchart of a signal processing method according to an embodiment of the present invention.

FIG. 10 shows a schematic flowchart of a signal processing method 900 according to an embodiment of the present invention. As shown in FIG. 10, the signal processing method 900 is applied to a transmitter. The transmitter includes a constellation mapper, a signal conversion module, a digital signal processor, and a digital-to-analog converter. The signal processing method 900 includes:

Operation S910. The constellation mapper determines a mapping relationship between a bit stream and a constellation point in a polar coordinate system.

Operation S920. The constellation mapper generates a constellation symbol data flow according to the mapping relationship.

Operation S930. The signal conversion module converts the constellation symbol data flow into an amplitude signal and a phase signal, where the amplitude signal is a 2-level analog signal, and the phase signal is an 8-level digital signal.

Operation S940. The digital signal processor performs digital signal processing on the phase signal, to generate a multi-level digital signal.

Operation S950. The digital-to-analog converter converts the multi-level digital signal into a multi-level analog signal.

Therefore, in the signal processing method in this embodiment of the present invention, a bit stream is mapped into a constellation symbol data flow in a polar coordinate system, and the constellation symbol data flow is converted into an amplitude signal and a phase signal. In this way, calculation complexity of a digital signal processor is reduced, and a quantity and power consumption of digital-to-analog converters are reduced, so as to achieve communication of low power consumption, low complexity, and low costs, and improve communication performance.

In this embodiment of the present invention, optionally, the method 900 further includes:

performing, by a saturation driver, saturated amplification on the amplitude signal; performing, by a linear driver, linear amplification on the multi-level analog signal; and converting, by an optical transmitter front-end module, the amplitude signal obtained after the saturated amplification and the multi-level analog signal obtained after the linear amplification into an optical signal.

In this embodiment of the present invention, optionally, the method 900 further includes:

converting, by a radio frequency transmitter front-end module, the amplitude signal and the multi-level analog signal into a radio frequency signal.

Optionally, in this embodiment of the present invention, that the constellation mapper determines the mapping relationship between the bit stream and the constellation point in the polar coordinate system includes:

adjusting, by the constellation mapper, the mapping relationship between the bit stream and the constellation point, so that a constellation decider can enlarge a decision area.

Therefore, in the signal processing method in this embodiment of the present invention, a bit stream is mapped into a constellation symbol data flow in a polar coordinate system, and the constellation symbol data flow is converted into an amplitude signal and a phase signal. In this way, calculation complexity of a digital signal processor is reduced, and a quantity and power consumption of digital-to-analog converters are reduced, so as to achieve communication of low power consumption, low complexity, and low costs.

It should be understood that the signal processing method 900 according to this embodiment of the present invention may correspond to execution bodies of a transmitter 300 in embodiments of the present invention, and the foregoing and other operations and/or functions of the various modules of the transmitter 300 are respectively used to implement corresponding steps of the foregoing various methods, and details are not described herein for brevity.

Figure 11:
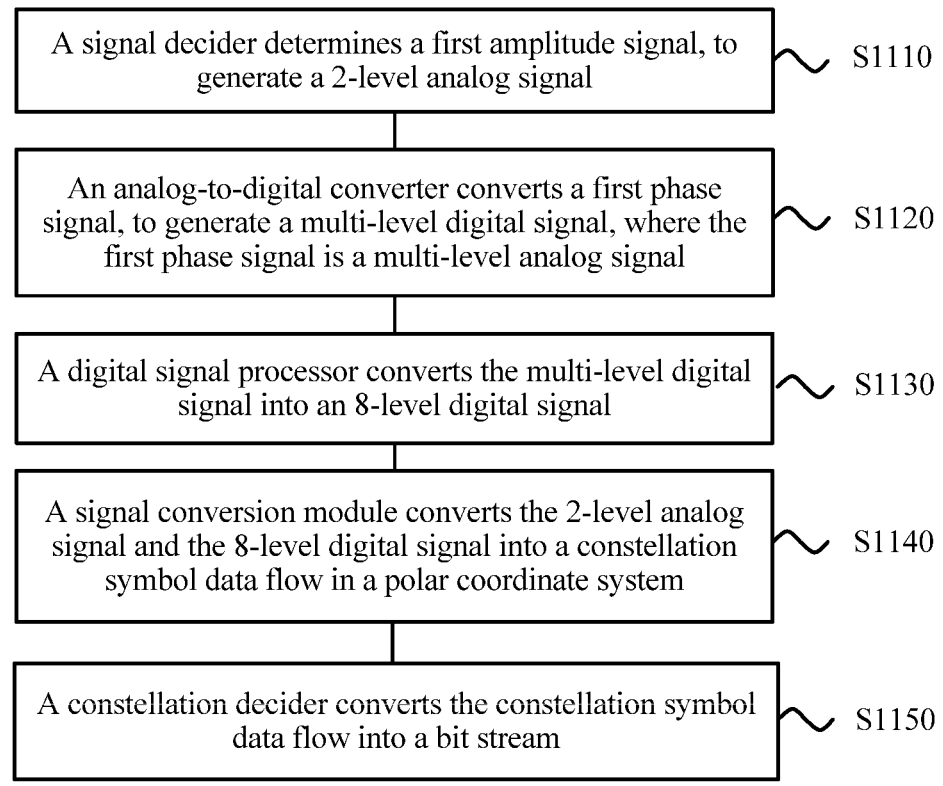
FIG. 11 is a schematic flowchart of a signal processing method according to another embodiment of the present invention.

FIG. 11 shows a schematic flowchart of a signal processing method 1100 according to an embodiment of the present invention, and the method 1100 is applied to a receiver 400. The receiver includes a signal decider, an analog-to-digital converter, a digital signal processor, a signal conversion module, and a constellation decider. The method 1100 includes:

Operation S1110. The signal decider decides a first amplitude signal, to generate a 2-level analog signal.

Operation S1120. The analog-to-digital converter converts a first phase signal, to generate a multi-level digital signal, where the first phase signal is a multi-level analog signal.

Operation S1130. The digital signal processor converts the multi-level digital signal into an 8-level digital signal.

Operation S1140. The signal conversion module converts the 2-level analog signal and the 8-level digital signal into a constellation symbol data flow in a polar coordinate system.

Operation S1150. The constellation decider converts the constellation symbol data flow into a bit stream.

Therefore, in the signal processing method in this embodiment of the present invention, calculation complexity of a digital signal processor is reduced, and a quantity and power consumption of analog-to-digital converters are reduced, so as to achieve communication of low power consumption, low complexity, and low costs.

Optionally, in this embodiment of the present invention, the method 1100 further includes:

converting, by an optical receiver front-end module, an optical signal into a second amplitude signal and a second phase signal;

performing, by a saturation trans-impedance amplifier, saturated amplification on the second amplitude signal, to generate the first amplitude signal; and performing, by a linear trans-impedance amplifier, linear amplification on the second phase signal, to generate the first phase signal.

Optionally, in this embodiment of the present invention, the method 1100 further includes:

converting, by a radio frequency receiver front-end module, a radio frequency signal into the first amplitude signal and the first phase signal.

Therefore, in the signal processing method in this embodiment of the present invention, calculation complexity of a digital signal processor is reduced, and a quantity and power consumption of analog-to-digital converters are reduced, so as to achieve communication of low power consumption, low complexity, and low costs.

It should be understood that the signal processing method 1100 according to this embodiment of the present invention may correspond to execution bodies of a receiver 400 in embodiments of the present invention, and the foregoing and other operations and/or functions of the various modules of the receiver 400 are respectively used to implement corresponding steps of the foregoing various methods, and details are not described herein for brevity.

Figure 12:
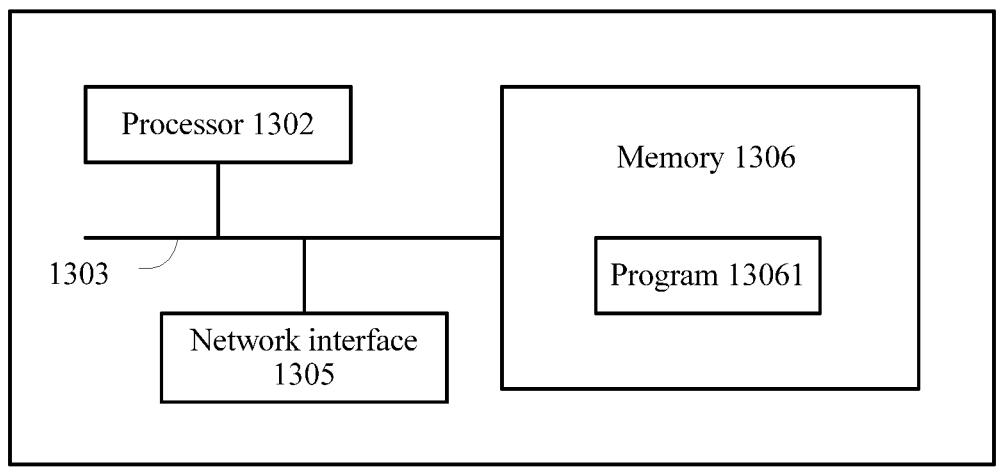
FIG. 12 is a schematic structural diagram of a transmitter according to an embodiment of the present invention.

FIG. 12 shows a structure of a transmitter according to another embodiment of the present invention. The transmitter includes at least one processor 1302 (for example, a CPU), at least one network interface 1305 or another communications interface, a memory 1306, and at least one communications bus 1303 that is configured to implement connection and communication between these components. The processor 1302 is configured to execute an executable module, such as a computer program, stored in the memory 1306. The memory 1306 may include a high-speed random access memory (RAM), or may further include a non-volatile memory, such as at least one magnetic disk memory. A communication connection between the transmitter and at least one other network element is implemented by using the at least one network interface 1305 (which may be wired or wireless).

In some implementation manners, the memory 1306 stores a program 13061, and the processor 1302 executes the program 13061 for executing some operations:

determining a mapping relationship between a bit stream and a constellation point in a polar coordinate system;

generating a constellation symbol data flow according to the mapping relationship;

converting the constellation symbol data flow into an amplitude signal and a phase signal, where the amplitude signal is a 2-level analog signal, and the phase signal is an 8-level digital signal;

performing digital signal processing on the phase signal, to generate a multi-level digital signal; and converting the multi-level digital signal into a multi-level analog signal.

In one embodiment, the processor 1302 is further configured to:

perform saturated amplification on the amplitude signal;

perform linear amplification on the multi-level analog signal; and convert the amplitude signal obtained after the saturated amplification and the multi-level analog signal obtained after the linear amplification into an optical signal.

In one embodiment, the processor 1302 is further configured to:

convert the amplitude signal and the multi-level analog signal into a radio frequency signal.

In this embodiment of the present invention, optionally, the processor 1302 is specifically configured to:

adjust the mapping relationship between the bit stream and the constellation point, so that a constellation decider can enlarge a decision area.

It may be learned from the technical solution provided above in this embodiment of the present invention, in this embodiment of the present invention, a bit stream is mapped into a constellation symbol data flow in a polar coordinate system, and the constellation symbol data flow is converted into an amplitude signal and a phase signal. In this way, calculation complexity of a digital signal processor is reduced, and a quantity and power consumption of digital-to-analog converters are reduced, so as to achieve communication of low power consumption, low complexity, and low costs.

Figure 13:
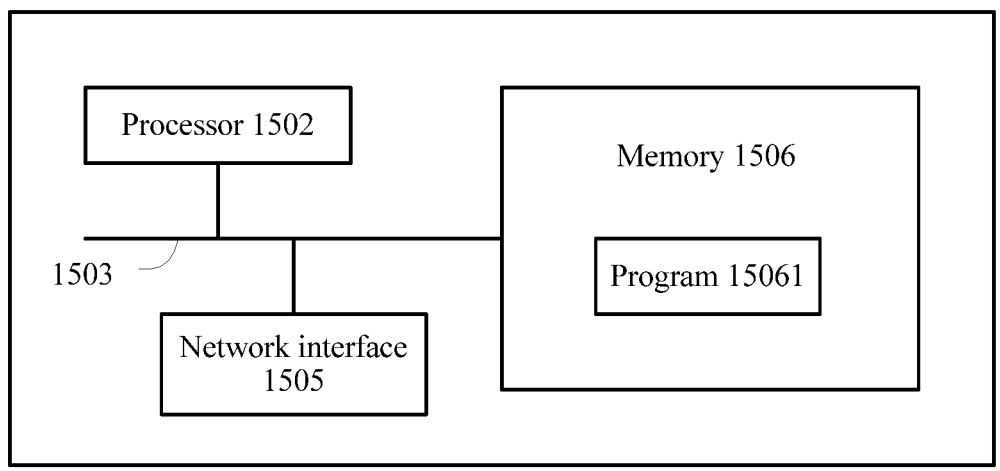
FIG. 13 is a schematic structural diagram of a receiver according to another embodiment of the present invention.

FIG. 13 shows a structure of a receiver according to another embodiment of the present invention. The receiver includes at least one processor 1502 (for example, a CPU), at least one network interface 1505 or another communications interface, a memory 1506, and at least one communications bus 1503 that is configured to implement connection and communication between these components. The processor 1502 is configured to execute an executable module, such as a computer program, stored in the memory 1506. The memory 1506 may include a high-speed random access memory (RAM), or may further include a non-volatile memory such as at least one magnetic disk memory. A communication connection between the transmitter and at least one other network element is implemented by using the at least one network interface 1505 (which may be wired or wireless).

In some implementation manners, the memory 1506 stores a program 15061, and the processor 1502 executes the program 15061 for executing the following operations:

deciding a received first amplitude signal, to generate a 2-level analog signal;

converting a received first phase signal, to generate a multi-level digital signal, where the first phase signal is a multi-level analog signal;

converting the multi-level digital signal into an 8-level digital signal;

converting the 2-level analog signal and the 8-level digital signal into a constellation symbol data flow in a polar coordinate system; and converting the constellation symbol data flow into a bit stream.

In one embodiment, the processor 1502 is further configured to:

convert an optical signal into a second amplitude signal and a second phase signal;

perform saturated amplification on the second amplitude signal, to generate the first amplitude signal; and perform linear amplification on the second phase signal, to generate the first phase signal.

In this embodiment of the present invention, optionally, the processor 1502 is further configured to:

convert a radio frequency signal into the first amplitude signal and the first phase signal.

It may be learned from the technical solution provided above in this embodiment of the present invention, in this embodiment of the present invention, calculation complexity of a digital signal processor is reduced, and a quantity and power consumption of analog-to-digital converters are reduced, so as to achieve communication of low power consumption, low complexity, and low costs.

It should be understood that, the specific examples in the present invention are merely intended to help a person skilled in the art better understand the embodiments of the present invention, but are not intended to limit the scope of the embodiments of the present invention.

It should further be understood that in the embodiments of the present invention, "B corresponding to A" indicates that B is associated with A, and B may be determined according to A. However, it should further be understood that determining B according to A does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, transmitter, and unit, reference may be made to a corresponding process in the foregoing method embodiments, and details are not described herein again.

In the several embodiments provided in the present application, it should be understood that the disclosed system, transmitter, and method may be implemented in other manners. For example, the described transmitter embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the transmitters or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A transmitter, comprising:
   a constellation mapper to determine a mapping relationship between a bit stream and a constellation point in a polar coordinate system, and generate a constellation symbol data flow according to the mapping relationship;
   a signal converter to convert the constellation symbol data flow into an amplitude signal and a phase signal;
   a digital signal processor to perform digital signal processing on the phase signal to generate a multi-level digital signal;
   a digital-to-analog converter to convert the multi-level digital signal into a multi-level analog signal;
   a saturation driver to perform saturated amplification directly on the amplitude signal converted by the signal converter;
   a linear driver to perform linear amplification on the multi-level analog signal; and
   an optical transmitter front-end module to convert the amplitude signal obtained after the saturated amplification and the multi-level analog signal obtained after the linear amplification into an optical signal.

2. The transmitter according to claim 1, wherein the constellation mapper is configured to:
   adjust the mapping relationship between the bit stream and the constellation point, so that a constellation decider can enlarge a decision area.

3. The transmitter according to claim 1, wherein the amplitude signal is a 2-level analog signal, and the phase signal is an 8-level digital signal.

4. A receiver, comprising:
   a signal decider to determine a first amplitude signal, to generate a 2-level analog signal;
   an analog-to-digital converter to convert a first phase signal to a multi-level digital signal, wherein the first phase signal is a multi-level analog signal;
   a digital signal processor to convert the multi-level digital signal into an 8-level digital signal;
   a signal converter to convert the 2-level analog signal and the 8-level digital signal into a constellation symbol data flow in a polar coordinate system; and
   a constellation decider to convert the constellation symbol data flow into a bit stream.

5. The receiver according to claim 4, further comprising:
   an optical receiver front-end module to convert an optical signal into a second amplitude signal and a second phase signal;
   a saturation trans-impedance amplifier to perform saturated amplification on the second amplitude signal, to generate the first amplitude signal; and
   a linear trans-impedance amplifier to perform linear amplification on the second phase signal, to generate the first phase signal.

6. The receiver according to claim 4, further comprising:
   a radio frequency receiver front-end module to convert a radio frequency signal into the first amplitude signal and the first phase signal.

7. A signal processing method performed by a transmitter, the method comprising:
   determining, by a constellation mapper, a mapping relationship between a bit stream and a constellation point in a polar coordinate system;
   generating, by the constellation mapper, a constellation symbol data flow according to the mapping relationship;
   converting, by a signal converter, the constellation symbol data flow into an amplitude signal and a phase signal;
   performing, by a digital signal processor, digital signal processing on the phase signal, to generate a multi-level digital signal;
   converting, by a digital-to-analog converter, the multi-level digital signal into a multi-level analog signal;
   performing, by a saturation driver, saturated amplification directly on the amplitude signal converted by the signal converter;
   performing, by a linear driver, linear amplification on the multi-level analog signal; and
   converting, by an optical transmitter front-end module, the amplitude signal obtained after the saturated amplification and the multi-level analog signal obtained after the linear amplification into an optical signal.

8. The method according to claim 7, wherein the determining, by the constellation mapper, a mapping relationship between a bit stream and a constellation point in a polar coordinate system comprises:

adjusting, by the constellation mapper, the mapping relationship between the bit stream and the constellation point, so that a constellation decider can enlarge a decision area.

9. The method according to claim 7, wherein the amplitude signal is a 2-level analog signal, and the phase signal is an 8-level digital signal.

10. A signal processing method performed by a receiver, the method comprising:

deciding, by a signal decider, a first amplitude signal, to generate a 2-level analog signal;

converting, by an analog-to-digital converter, a first phase signal, to generate a multi-level digital signal, wherein the first phase signal is a multi-level analog signal;

converting, by a digital signal processor, the multi-level digital signal into an 8-level digital signal;

converting, by a signal converter, the 2-level analog signal and the 8-level digital signal into a constellation symbol data flow in a polar coordinate system; and converting, by a constellation decider, the constellation symbol data flow into a bit stream.

11. The method according to claim 10, further comprising:

converting, by an optical receiver front-end module, an optical signal into a second amplitude signal and a second phase signal;

performing, by a saturation trans-impedance amplifier, saturated amplification on the second amplitude signal, to generate the first amplitude signal; and performing, by a linear trans-impedance amplifier, linear amplification on the second phase signal, to generate the first phase signal.

12. The method according to claim 10, further comprising:

converting, by a radio frequency receiver front-end module, a radio frequency signal into the first amplitude signal and the first phase signal.

* * * * *